US012792484B2

(12) United States Patent
Mukherjee et al.

(10) Patent No.: US 12,792,484 B2
(45) Date of Patent: Nov. 10, 2026

(54) SYSTEMS AND METHODS FOR DETERMINING PERFORMANCE OF A COMPUTATIONAL STORAGE DEVICE

(71) Applicant: Samsung Electronics Co., Ltd., Suwon-si (KR)

(72) Inventors: Nirjhar Mukherjee, Pittsburgh, PA (US); Yangwook Kang, San Jose, CA (US); Changho Choi, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 536 days.

(21) Appl. No.: 18/367,834

(22) Filed: Sep. 13, 2023

(65) Prior Publication Data

US 2024/0411659 A1 Dec. 12, 2024

Related U.S. Application Data

(60) Provisional application No. 63/471,929, filed on Jun. 8, 2023.

(51) Int. Cl.
*G06F 11/34* (2006.01)
*G06F 11/30* (2006.01)

(52) U.S. Cl.
CPC ...... *G06F 11/3419* (2013.01); *G06F 11/3034* (2013.01); *G06F 11/3466* (2013.01)

(58) Field of Classification Search
CPC ............. G06F 11/3034; G06F 11/3419; G06F 11/3466; G06F 11/3485; G06F 11/3428
See application file for complete search history.

(56) References Cited

U.S. PATENT DOCUMENTS 9,836,421 B1 12/2017 Bshara et al.
10,148,756 B2 12/2018 Gardner
11,093,409 B1 8/2021 Polak et al.
2014/0373024 A1* 12/2014 Watts .................... G06F 9/5094 718/104
2015/0052241 A1* 2/2015 Walker ................ G06F 11/3058 709/224
2017/0024316 A1* 1/2017 Park ...................... G06F 12/084
2022/0244960 A1* 8/2022 Jones .................... G06F 9/4837
2024/0378094 A1* 11/2024 Dwivedi ............. G06F 16/9024

FOREIGN PATENT DOCUMENTS

CN 112631225 A 4/2021
TW I318358 B 12/2009
WO WO 2014/070342 A1 5/2014

* cited by examiner

*Primary Examiner* — Phong H Dang
(74) *Attorney, Agent, or Firm* — Womble Bond Dickinson (US) LLP

(57) ABSTRACT

Systems and methods for determining performance of a computation storage device are disclosed. A program that is configured to be executed by a computational storage device may be identified. An action may be performed with respect to the program, and a first performance value may be computed based on performing the action with respect to the program. Data may be retrieved from a non-volatile storage medium, and a second performance value may be computed based on retrieving the data from the non-volatile storage medium. A total performance of the computational storage device may be computed based on the first performance value and the second performance value.

20 Claims, 7 Drawing Sheets

SYSTEMS AND METHODS FOR DETERMINING PERFORMANCE OF A COMPUTATIONAL STORAGE DEVICE

CROSS-REFERENCE TO RELATED APPLICATION(S)

The present application claims priority to and the benefit of U.S. Provisional Application No. 63/471,929, filed Jun. 8, 2023, entitled "COMPUTATIONAL STORAGE DEVICE EMULATOR," the entire content of which is incorporated herein by reference.

FIELD

One or more aspects of embodiments according to the present disclosure relate to computation storage devices, and more particularly to determining performance of a computation storage device.

BACKGROUND

Applications may perform computations on large amounts of data. As such types of computations increase, it may be desirable to employ efficient and cost-effective data processing solutions.

The above information disclosed in this Background section is only for enhancement of understanding of the background of the present disclosure, and therefore, it may contain information that does not form prior art.

SUMMARY

One or more embodiments of the present disclosure are directed to a system comprising a non-volatile storage medium and a processor coupled to the non-volatile storage medium. The processor is configured to: identify a program configured to be executed by a computational storage device; perform an action with respect to the program; compute a first performance value based on performing the action with respect to the program; retrieve data from the non-volatile storage medium; compute a second performance value based on retrieving the data from the non-volatile storage medium; and compute total performance of the computational storage device based on the first performance value and the second performance value.

According to some embodiments, the processor is further configured to: receive a first command and a second command from an application; and translate the first command to a translated first command, and the second command to a translated second command, wherein the processor is configured to perform the action with respect to the program based on the translated first command, and the processor is configured to retrieve the data from the non-volatile storage medium based on the translated second command.

According to some embodiments, the first command and the second command are based on a first interface for communicating with the computational storage device, and the translated first command and the translated second command are based on a second interface for communicating with the computational storage device.

According to some embodiments, the non-volatile storage medium includes a solid state drive.

According to some embodiments, the processor being configured to perform the action with respect to the program includes the processor being configured to: receive the program from an application; execute the program; and measure an execution time for the program, wherein the first performance value includes the execution time.

According to some embodiments, the processor being configured to perform the action with respect to the program includes the processor being configured to: receive the program from an application; identify latency information associated with the computational storage device; and determine an execution time of the program based on the latency information, wherein the first performance value includes the execution time.

According to some embodiments, the processor is further configured to: transmit a signal to the application based on detecting a criterion associated with the execution time.

According to some embodiments, the latency information includes data processing latency of at least one of an ARM processor, field-programmable gate array (FPGA), or graphics processing unit (GPU).

According to some embodiments, the first performance value includes at least one of command processing latency, message passing latency, hardware access latency, or memory access latency.

According to some embodiments, the processor being configured to compute the second performance value includes the processor being configured to: transmit a command to the non-volatile storage medium to retrieve the data; and measure a latency in retrieving the data based on the command.

One or more embodiments of the present disclosure are also directed to a method comprising: identifying a program configured to be executed by a computational storage device; performing an action with respect to the program; computing a first performance value based on performing the action with respect to the program; retrieving data from a non-volatile storage medium; computing a second performance value based on retrieving the data from the non-volatile storage medium; and computing total performance of the computational storage device based on the first performance value and the second performance value.

These and other features, aspects and advantages of the embodiments of the present disclosure will be more fully understood when considered with respect to the following detailed description, appended claims, and accompanying drawings. Of course, the actual scope of the invention is defined by the appended claims.

BRIEF DESCRIPTION OF THE DRAWINGS

Non-limiting and non-exhaustive embodiments of the present embodiments are described with reference to the following figures, wherein like reference numerals refer to like parts throughout the various views unless otherwise specified.

DETAILED DESCRIPTION

Figure 1:
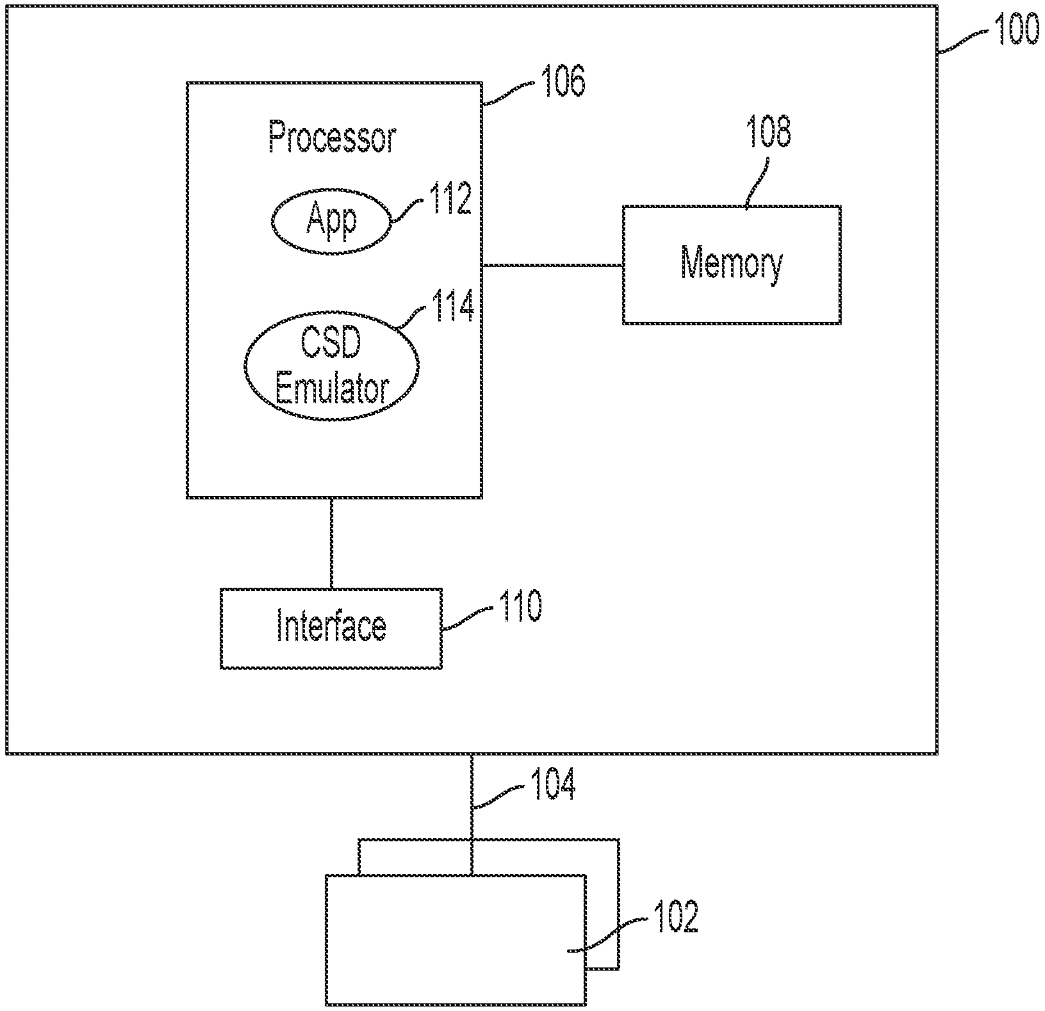
FIG. 1 depicts a block diagram of a system for emulating a computational storage device according to one or more embodiments.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, in the drawings, the relative sizes of elements, layers, and regions may be exaggerated and/or simplified for clarity.

Embodiments of the present disclosure are described below with reference to block diagrams and flow diagrams. Thus, it should be understood that each block of the block diagrams and flow diagrams may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (for example the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flow diagrams. Accordingly, the block diagrams and flow diagrams support various combinations of embodiments for performing the specified instructions, operations, or steps.

Applications may perform computations on large amounts of data. As such computations increase, it may be desirable to employ a computational storage device (CSD) (for example, a solid state drive (SSD) with an embedded processor or Field Programmable Gate Array (FPGA)) to handle some of the computations. Transferring computation (referred to as "offloading") the computation to the CSD may allow the computation to be performed in a more efficient and cost-effective way.

It may be desirable to evaluate the offloading benefits of a CSD before proceeding with the offloading, or even before purchasing the CSD and integrating it with a host device. For example, it may be desirable to conduct performance and/or bottleneck analysis of the CSD via an emulator. It may be difficult, however, to emulate the offloading benefits of a target application using current emulators. For example, current emulators may not support commands for executing the programs to be emulated. Current emulators may also use a random access memory (RAM) (e.g., instead of the storage device that would be actually be used by the CSD), to simulate the storage device. In addition, current emulators may generally not provide an estimated throughput of the CSD.

In general terms, one or more embodiments of the present disclosure are directed to systems and methods for performing an action with respect to a task, program, or runtime downloadable function (collectively referenced as a program) offloaded (or planned to be offloaded) by the host device to a CSD. The action may be, for example, emulating or imitating performance of the program by the CSD, although embodiments are not limited thereto, and may include other types of computations for measuring performance of the CSD in executing the program. For simplicity's sake, however, the action is hereinafter referred to as emulating. The device for performing such emulating is hereinafter referred to as a CSD emulator.

The emulating performed by the CSD emulator may involve actual execution of the program and/or simulating latencies of the execution process. Based on the emulating, the CSD emulator may compute an end-to-end performance (e.g., compute throughput and/or latency) of the CSD if the program were to be executed by the CSD. Other performance metrics may also be computed, such as, for example, amount of data processed, average compute latency, CSD throughput, CSD utilization, and/or the like.

In some embodiments, the CSD emulator emulates the execution of multiple programs. For example, the multiple programs may be emulated (e.g., in a concurrent manner), by multiple instances of the CSD. In some embodiments, the CSD emulator uses a storage device (e.g., an SSD) as the storage backend. The use of the SSD for the storage backend may allow a more accurate prediction of the input/output (I/O) latency in executing an offloaded task, than using the RAM of the host device as the storage backend.

In some embodiments, the CSD emulator emulates performance of an offloaded program in one or more modes. In an execution mode, the CSD emulator may execute the offloaded program using hardware resources of the host device. In a latency modeling mode, the CSD emulator may model (without actual execution of the program) one or more latencies in executing the program based on information of the emulated CSD. The information may be, for example, the hardware specification of the emulated CSD.

The emulation mode to be used by the CSD emulator may be set, for example, in a configuration file for the CSD emulator. In some embodiments, regardless of the emulation mode that is used, an I/O latency is measured based on the actual reading and writing to a storage device. The measured I/O latency may be added to a computation latency (either actual or modeled), to determine an end-to-end execution time of an offloaded program.

In some embodiments, the CSD emulator is configured with a command set used by the CSD. The command set may be a CSD command set that adheres to a non-volatile memory express (NVMe) protocol, such as, for example, TP4091, although embodiments are not limited thereto. In some embodiments, the CSD emulator receives commands from an application for offloading and executing the offloaded program, and for performing reading and writing of data used by the program. The commands may be generated and transmitted via computational storage device API (CS API). The CSD emulator may translate the CS API command into a CSD command that adheres to TP4091. The translated CSD command may then be used by the CSD emulator for emulating the execution of the offloaded program.

FIG. 1 depicts a block diagram of a system for emulating a CSD according to one or more embodiments. The system may include a host computing device ("host") 100 coupled to one or more storage devices 102 over one or more data communication links 104.

The data communication link 104 may facilitate communications (e.g., using a connector and a protocol) between the host 100 and the storage device 102. In some embodiments, the data communication link 104 may facilitate the exchange of storage requests and responses between the host 100 and the storage device 102. In some embodiments, the data communication link 104 may facilitate data transfers between the host 100 and the storage device 102. In this regard, in various embodiments, the data communications link 104 (e.g., the connector and the protocol thereof) may include (or may conform to) a Compute Express Link (CXL), Cache Coherent Interconnect for Accelerators (CCIX), Small Computer System Interface (SCSI), Non Volatile Memory Express (NVMe), Peripheral Component Interconnect Express (PCIe), remote direct memory access (RDMA) over Ethernet, Serial Advanced Technology Attachment (SATA), Fiber Channel, Serial Attached SCSI (SAS), NVMe over Fabric (NVMe-oF), and/or the like. In other embodiments, the data communications link 104 (e.g., the connector and the protocol thereof) may include (or may conform to) various general-purpose interfaces, for example, such as Ethernet, Universal Serial Bus (USB), and/or the like.

The host 100 may include a processor 106, memory 108, and an application interface 110. The processor 106 may be a general purpose processor, such as, for example, a central processing unit (CPU) core of the host 100. The memory 108 may include, for example, a random access memory (RAM) (e.g., a dynamic random-access memory (DRAM)), read-only memory (ROM), and the like.

The processor 106 may be configured to run one or more applications 112 based on instructions stored in the memory 108. The application 112 may be any application configured to transmit requests (e.g., data access requests, program execution requests, etc.) to the storage device 102. For example, the application 112 may be a big data analysis application, e-commerce application, database application, machine learning application, and/or the like.

In some embodiments, the application 112 includes one or more programs that may be offloaded to a CSD. The program may be one that requires a heavy amount of I/O requests to and from the storage device 102, and/or uses a large amount of memory and computing resources of the host 100. The offloading may be desirable if the CSD is able to execute the program more efficiently than the host 100. The application 112 may receive results from executing the one or more programs. The results may be used by the application 112 to generate an output.

In some embodiments, the host 100 includes a CSD emulator 114 that is configured to emulate computation of a program by a CSD. The CSD may or may not already be integrated with the host (e.g., as one of the storage devices 102). The emulation may occur even if the CSD is not yet integrated with the host 100. The emulation of the computation may allow the CSD emulator 114 to determine an end-to-end performance, execution time, or compute latency (used interchangeably herein) achieved from offloading the program to the CSD. Based on the emulation, a benefit of offloading the program to the CSD may be evaluated by a client (e.g., by a developer of the application). One or more actions may be taken based on the evaluation. The action may be, for example, purchase and integration of a CSD that may not yet be part of the system. In another example, the action may be to proceed with the offloading of the program to the CSD.

In some embodiments, the application interface 110 includes a computational storage (CS) API configured to interface between the application and a CSD. The CS API may be based, for example, on the SNIA Computational Storage Architecture and Programming Model, although embodiments are not limited thereto. In some embodiments, the CS API may be accessed by a developer to create a program to be offloaded to a CSD. In some embodiments, the CS API provides a set of standardized commands to offload programs to the CSD, execute the offloaded programs, exchange transmit I/O requests, and/or the like.

In some embodiments, one or more of the storage devices 102 take the form of a solid state drive (SSD), persistent memory, and/or the like. However, the present disclosure is not limited thereto, and in other embodiments, one or more of the storage devices may include (or may be) any suitable storage device, for example, such as a magnetic storage device (e.g., a hard disk drive (HDD), and the like), an optical storage device (e.g., a Blue-ray disc drive, a compact disc (CD) drive, a digital versatile disc (DVD) drive, and the like), other kinds of flash memory devices (e.g., a USB flash drive, and the like), and/or the like. In various embodiments, the storage device 102 may conform to a large form factor standard (e.g., a 3.5 inch hard drive form-factor), a small form factor standard (e.g., a 2.5 inch hard drive form-factor), an M.2 form factor, an E1.S form factor, and/or the like. In other embodiments, the storage device 102 may conform to any suitable or desired derivative of these form factors.

In some embodiments, one or more of the storage devices 102 include (or are embodied as) a CSD. For example, the CSD may be added as a storage device 102 upon determining that there are performance benefits in offloading one or more programs to the CSD.

Figure 2:
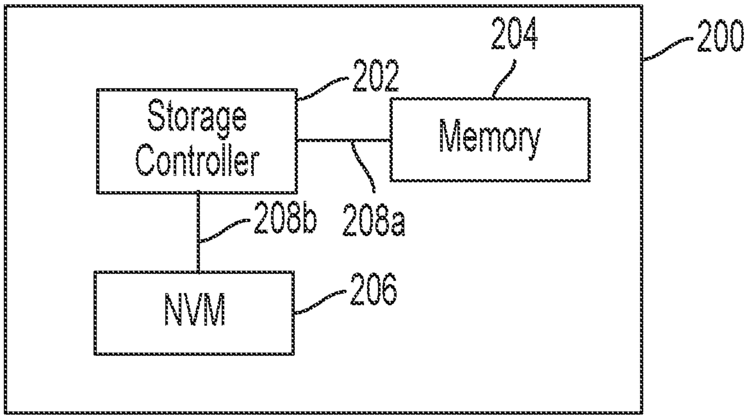
FIG. 2 depicts a block diagram of a computational storage device according to one or more embodiments.

FIG. 2 depicts a block diagram of a CSD 200 according to one or more embodiments. In some embodiments, the CSD 200 includes a storage controller 202, storage memory 204, and non-volatile memory (NVM) 206. The storage memory 204 may be high-performing memory of the CSD 200, and may include (or may be) volatile memory, for example, such as DRAM, but the present disclosure is not limited thereto, and the storage memory 204 may be any suitable kind of high-performing volatile or non-volatile memory.

In some embodiments, the NVM 206 persistently stores data received, for example, from the host 100. The NVM 206 may include, for example, NAND flash memory, but the present disclosure is not limited thereto, and the NVM 206 may include any suitable kind of memory for persistently storing the data according to an implementation of the CSD 200 (e.g., magnetic disks, tape, optical disks, and/or the like).

The storage controller 202 may be connected to the NVM 206 and the storage memory 204 over one or more storage interfaces 208*a*, 208*b*. In some embodiments, the storage controller 202 includes at least one processing component embedded thereon for executing programs and interfacing with the host 100, the storage memory 204, and the NVM 206. The processing component may include, for example, an ARM processor, a graphics processing unit (GPU), a field programmable gate array (FPGA), and/or another digital circuit (e.g., a microcontroller, a microprocessor, a digital signal processor, or a logic device (e.g., an application-specific integrated circuit (ASIC)) capable of executing offloaded programs and handle I/O requests from the host 100.

In some embodiments, the CSD receives an offloaded program and executes the program via a processing component of the storage controller 202. In some embodiments, the offloaded program is in an extended Berkeley Packet filter (eBPF) program format, although embodiments are not limited thereto. The offloaded program may take other formats such as, for example, other types of machine code, bytecode, or program format that may be executed by the processing component. The offloaded program may be stored, for example, in the storage memory 204.

In some embodiments, the storage controller 202 receives input/output (I/O) commands (e.g. load or store requests) from the application 112 for retrieving and storing data from and to the NVM 206. For example, the application 112 may transmit a load command to retrieve, from the NVM 206, data to be processed by the offloaded program.

Figure 3:
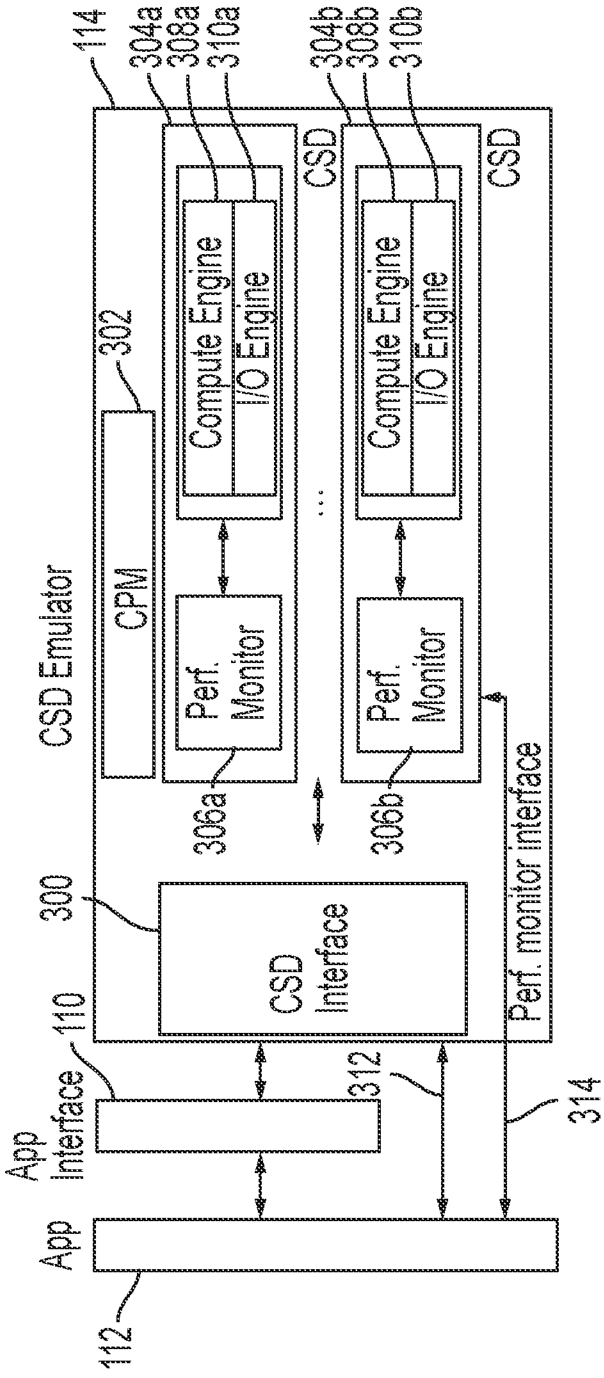
FIG. 3 depicts a block diagram of a computational storage device emulator configured to interface with an application according to one or more embodiments.

FIG. 3 depicts a block diagram of the CSD emulator 114 configured to interface with the application 112 according to one or more embodiments. The CSD emulator 114 may run in a user space of the host memory 108 to prevent a kernel crash in the event of a crash of the CSD emulator 114.

In some embodiments, the CSD emulator 114 includes a CSD interface 300, a computational program memory (CPM) 302, and one or more CSD instances 304*a*, 304*b* (collectively referenced as 304). A separate CSD instance 304 may be created for a CSD 200 that is to be emulated. In some embodiments, the separate CSD instance 304 may be a virtual machine (VM) for emulating the corresponding CSD.

The CSD interface 300 may be configured to manage the CPM 302 and the CSD instances 304. For example, the CSD interface 300 may allocate, free, and/or assign memory (e.g., a first CPM) to a CSD instance (e.g., a first CSD instance 304*a*). The CSD interface 300 may further create or delete a CSD instance 304. In this regard, the CSD interface 300 may keep a list of the CSD instances 304 that are generated. In some embodiments, the number of CSD instances that are generated may depend on the number of programs that the application 112 indicates is to be offloaded to the CSD 200.

In some embodiments, the CSD interface 300 is configured to exchange communication messages between the application 112 and the one or more CSD instances 304. The application may send messages to the CSD interface 300 directly via a CSD link 312, or via an application interface 110.

In some embodiments the application uses the application interface 110 to generate one or more commands. The commands generated via the application interface 110 may differ from the communication interface and/or protocol (hereinafter referred to as the CSD interface protocol) used by the CSD 200. The application interface 110 may adhere to, for example, to the SNIA Computational Storage Architecture and Programming Model, although embodiments are not limited thereto. The CSD interface protocol may be, for example, NVMe TP4091, although embodiments are not limited thereto. In some embodiments, the CSD interface 300 is a plug-in to the application interface 110.

In some embodiments, the CSD interface 300 receives a CS API command from the application interface 110, and translates the command into a CSD command that adheres to the CSD interface protocol. The CS API command may be, for example, a command to execute a program, an I/O command, and/or the like. The CSD interface 300 may translate and forward the command to the appropriate CSD instance 304 to take an appropriate action in response to the command.

In some embodiments, the commands generated by the application 112 adhere to the CSD interface protocol. In these embodiments, the commands may be transmitted to the CSD emulator 114 via the CSD link 312, by-passing the application interface 110. In some embodiments, the CSD link 312 adheres to the NVMe TP4091 protocol.

In some embodiments, the CSD instances 304 include a performance monitoring engine 306*a*, 306*b* (collectively referred to as a performance monitor 306), compute engine 308*a*, 308*b* (collectively referenced as 308), and I/O engine 310*a*, 310*b* (collectively referenced as 310). The performance monitor 306, compute engine 308, and I/O engine may be implemented via hardware, firmware, software, or a combination of hardware, firmware, and/or software. In addition, although the performance monitor 306, compute engine 308, and I/O engine 310 are depicted as separate components, a person of skill in the art will recognize that the functionality of these components may be combined or integrated into a single component, or further subdivided into further sub-components without departing from the spirit and scope of the inventive concept.

In some embodiments, the compute engine 308 is configured to process a command to execute an offloaded program. The offloaded program may be, for example, an eBPF program, user-space BPF (uBPF), native binary, and/or the like. In some embodiments, one or more programs are emulated (e.g., concurrently) by the one or more compute engines 308 in the one or more CSD instances 304.

The compute engine 308 may emulate performance of the one or more programs using an execution mode or a latency modeling mode. The mode to be used may depend on the configuration of the CSD emulator 114 (e.g., during boot up). In some embodiments, a system administrator may select the mode to be used (e.g., via the application interface 110), and change the mode from one emulation to another. In some embodiments, the system administrator may select to use both the execution mode and the latency modeling mode (hereinafter referred to as a hybrid mode) for the emulation. In some embodiments, the selection of the mode may be automatic (e.g., without express user selection), based on the program to be emulated, the available information of the CSD to be emulated, available resources of the host 100, and/or the like.

In some embodiments, the CSD emulator 114 is further configured with information about the CSD 200 that is to be emulated. The information about the CSD 200 may include, without limitation, size of the CSD memory (e.g., memory 204), size of CSD storage space (e.g., NVM 206), type of embedded processor(s) (e.g., one or more processors of the storage controller 202), compute and data access speed, and/or other configuration parameters.

When configured in the execution mode, the compute engine 308 executes the offloaded program using hardware resources (e.g., the processor 106 and memory 108) of the host 100. In some embodiments, the execution of the program by the processor 106 emulates execution of the program by a processor (e.g., an ARM, GPU, and/or FPGA) of the CSD 200. A particular type of machine emulator or simulator may be invoked depending on the type of processor to be emulated. For example, the processor 106 may invoke an ARM system emulator such as QEMU for simulating running of the program on an ARM processor of the CSD 200. In another example, the processor may invoke an FPGA simulator to simulate running of the program on an FPGA. The processor 106 may measure the time of execution of the program and return the time to the performance monitor 306.

When configured in the latency modeling mode, the compute engine 308 may calculate (e.g., model) one or more latencies that may be encountered while executing the program by the CSD 200. In this regard, the compute engine 308 may access information (e.g., configuration parameters) of the CSD 200 to be emulated. The configuration parameters may include, for example, information for computing the one or more latencies. The one or more latencies that may be computed may include, without limitation, an interface command processing latency (e.g., latency to receive one command call from the host), internal message passing latency, hardware access and data processing latency (e.g., for an ARM, GPU, and/or FPGA), internal I/O throughput (e.g., from device flash memory to device DRAM), external I/O throughput (e.g., from device flash memory to host memory), memory access latency (e.g., read or write latency), and/or the like. The computed latencies may be provided to the performance monitor 306 for computing an estimated end-to-end execution time.

In some embodiments, the I/O engine 310 receives I/O commands from the CSD interface 300, and retrieves or stores data from or to the storage device 102 based on the I/O commands. The I/O operation may be synchronous and/or asynchronous. The I/O commands may be generated by the application 112 to retrieve data that may be needed by the offloaded program to perform a computation. The retrieved data may be stored in the CPM 302.

The I/O engine 310 may monitor the I/O latency, and provide the latency information to the performance monitor 306 for computing the end-to-end execution time. The use of the storage device 102 as the storage backend to execute the I/O commands may allow a more accurate prediction of the I/O latency in executing an offloaded program, than using the RAM of the host device as the storage backend. However, embodiments are not limited thereto, and the storage backend may include the host memory 108 (e.g., a host DRAM) as the storage backend.

In some embodiments, the performance monitor 306 collects the execution time from the compute engine 308 and the I/O latency from the I/O engine, and computes an end-to-end execution time for the offloaded program. In some embodiments, the CSD emulator 114 transmits a signal to the application 112 upon the end of the end-to-end execution time. For example, the CSD emulator 14 may return to the application 112 with a success or failure message. In the event that the compute engine 308 operates in the latency modeling mode, the CSD emulator 114 may sleep to simulate the estimated execution time before returning to the application 112.

In some embodiments, the performance monitor 306 may include a machine learning model for predicting performance of the CSD in executing a program. The machine learning model may be, for example, a neural network such as, for example, feed forward neural network, convolutional neural network, recurrent neural network, and/or the like. The neural network may be divided into two or more layers, such as an input layer that receives input data, an output layer that outputs a predicted performance of the CSD (e.g., a predicted execution time, latency, and/or other performance value), and one or more intermediate layers. The input data may include, without limitation, program data, CSD parameters, CSD workload, program path, and/or the like. The layers of the neural network may represent different groups or sets of artificial neurons, which may represent different functions performed by one or more processors on the input data to predict the performance of the CSD. The artificial neurons may apply different weights in the functions applied to the input data to attempt to predict the performance of the CSD.

In some embodiments, performance monitor 306 includes an option to model the estimated latency values based on the configuration parameters of the CSD, even when the compute engine 308 is operating in the execution mode. For example, the CSD may split execution of the program between an ARM processor and an FPGA. The compute engine 308 may simulate the execution of the ARM processor (e.g., via QEMU), but model the latency of the FPGA based on the configuration parameters of the CSD. The total performance of the program may be based on an aggregate of the simulated execution time of the ARM processor, and the modeled latency of the FPGA.

In some embodiments, the compute engine 308 is configured to execute in a hybrid mode that includes actual execution of the program (or a portion of the program), as well as modeling of the latency of the program (or the portion of the program). According to these embodiments, the performance monitor 306 may compare the estimated end-to-end execution time based on the modeled latency values, against the actual end-to-end execution time using the resources of the host 100. The performance monitor 306 may adjust a final end-to-end execution time reported to a client (e.g. a developer) based on the comparison. For example, the actual end-to-end execution time may be adjusted (e.g., replaced) based on the modeled latency values, or vice versa. In some embodiments, the final end-to-end execution time may be a combination (e.g., an average) of the actual end-to-end execution time and the modeled latency values.

In some embodiments, the performance monitor 306 is configured to collect other statistical performance data for reporting to the client. The collected statistical data may relate to data movement, memory usage, program storage usage, and/or the like. For example, the performance monitor 306 may collect a number of bytes read and/or written during execution of the program, a number of bytes processed, average compute latency, throughput of the CSD instance 304, CSD utilization, and/or the like. The collected statistical values and/or modeled latency values may be reported as a separate file to the client via the performance monitor interface 314.

In some embodiments, the latency values and statistical data collected by the performance monitor 306 are used by the client to make an optimization action. For example, a comparison (e.g., manual or automated) may be made of the expected performance (e.g., expected end-to-end execution time) of the application from offloading the program to the CSD, to performance of the application from executing the program using the processor 106 of the host 100. In another example, the statistical data may be evaluated for determining throughput and making other observations about the usage of the CSDs.

An optimization decision may be made based on the data collected by the performance monitor 306. The optimization decision may include, for example, whether to offload the program to the CSD, which program to offload and to which CSD, the number of programs to offload, and/or the like. For example, the performance data may identify one or more underutilized CSDs for maximizing use of such CSDs for offloaded programs.

Figure 4:
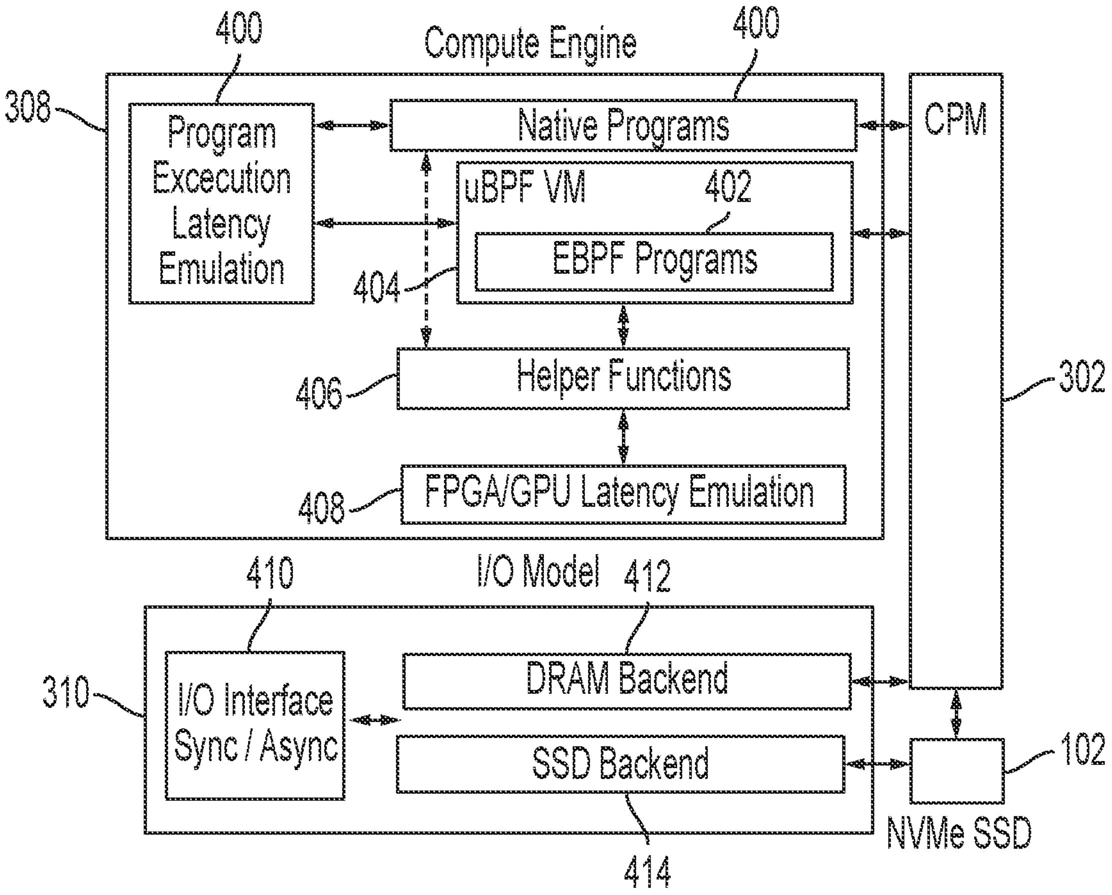
FIG. 4 depicts a block diagram of a compute engine and an input/output engine according to one or more embodiments.

FIG. 4 depicts a block diagram of the compute engine 308 and the I/O engine 310 according to one or more embodiments. The compute engine 308 may include a program execution or latency emulation component 400 that may execute a native program 402 or an eBPF program 402. The native program 402 may be one that is intended to be compiled and executed by the program execution or latency emulation component 400.

In some embodiments, execution of the eBPF program 402 may require use of a virtual machine (VM) 404. The eBPF program 402 may run inside the virtual machine 404. In some embodiments, one or more helper functions 406 are added to the VM 404 for emulating the use of other processing components 408 of the CSD, such as, for example, the FPGA or GPU, by the eBPF program 402.

In some embodiments, the I/O engine 310 includes an I/O interface component 410 for reading and writing data to and from a storage backend for emulating execution of an offloaded program. The I/O interface may be a synchronous API or asynchronous API.

The type of storage backend that is to be used for the emulation may depend on the configuration of the CSD emulator 114. In some embodiments, the storage backend is the CPM 302. The CPM 302 may take the form of a DRAM. In this regard, a DRAM backend component 412 may write and read data to and from the CPM 302.

In some embodiments, the storage backend is the storage device 102 (e.g., SSD). In this regard, an SSD backend 414 may write and read data to and from the storage device 102. The SSD backend 414 may utilize a protocol such as NVMe in writing and reading the data to and from the storage device 102.

Figure 5:
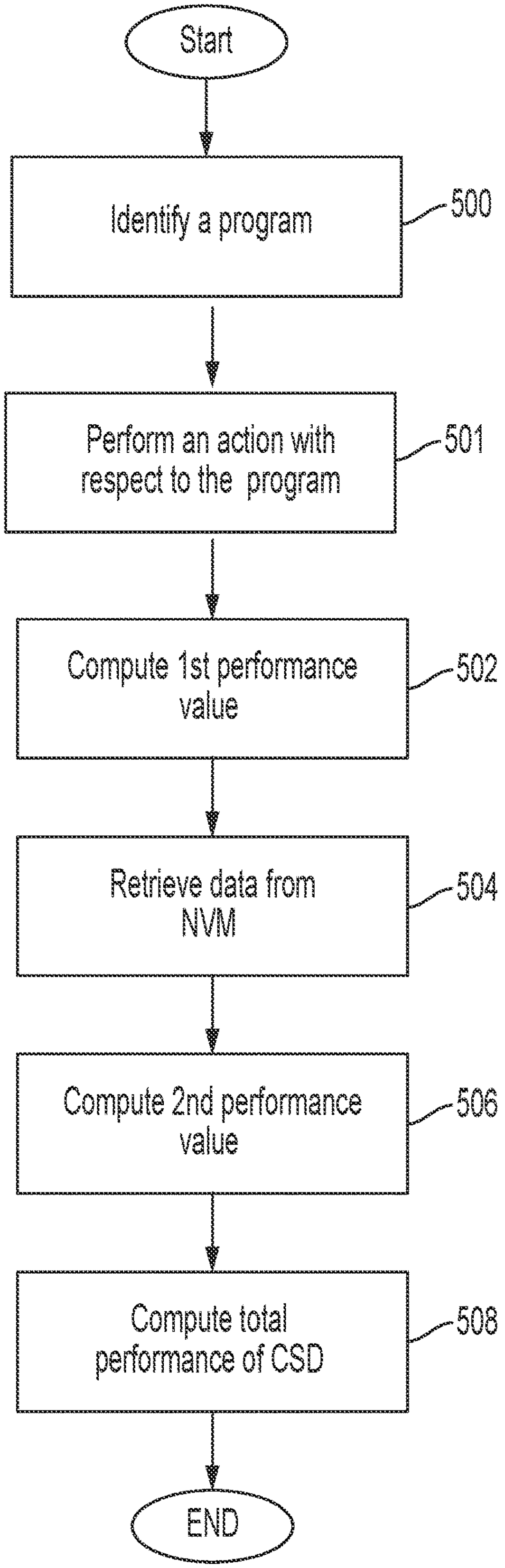
FIG. 5 depicts a flow diagram of a process for emulating performance of a computational storage device according to one or more embodiments.

FIG. 5 depicts a flow diagram of a process for emulating performance of a CSD according to one or more embodiments. The process starts, and in act 500, the compute engine 308 identifies a program configured to the executed by (e.g., via being offloaded to) the CSD 200.

In act 501, the compute engine 308 performs an action with respect to the program. The action may be, for example, an emulation action including actual execution of the program and/or simulating latencies involved in running the program.

In act 502, a first performance value is computed (e.g., by the performance monitor 306) based on performing the action with respect to the program. The first performance value may be an actual execution time and/or simulated execution time. The actual execution time may include the time taken to execute the program using the resources of the host 100. The simulated execution time may include a modeled compute latency based on information of the emulated CSD 200.

In act 504, the I/O engine 310 transmits a signal for retrieving data from a storage backend. The storage backend may be, for example, the storage device 102. In this regard, the I/O model 310 transmits a read command to the storage device 102, and measures a latency in retrieving the data and storing the retrieved data in the CPM 302.

In act 506, a second performance value is computed (e.g., by the performance monitor 306) based on the measured latency.

In act 508, a total performance value is computed (e.g., by the performance monitor 306) based on the first performance value and the second performance value. In some embodiments, the total performance value includes an end-to-end execution time in running the offloaded program. For example, the total performance value may be a sum of the first performance value and the second performance value.

Figure 6:
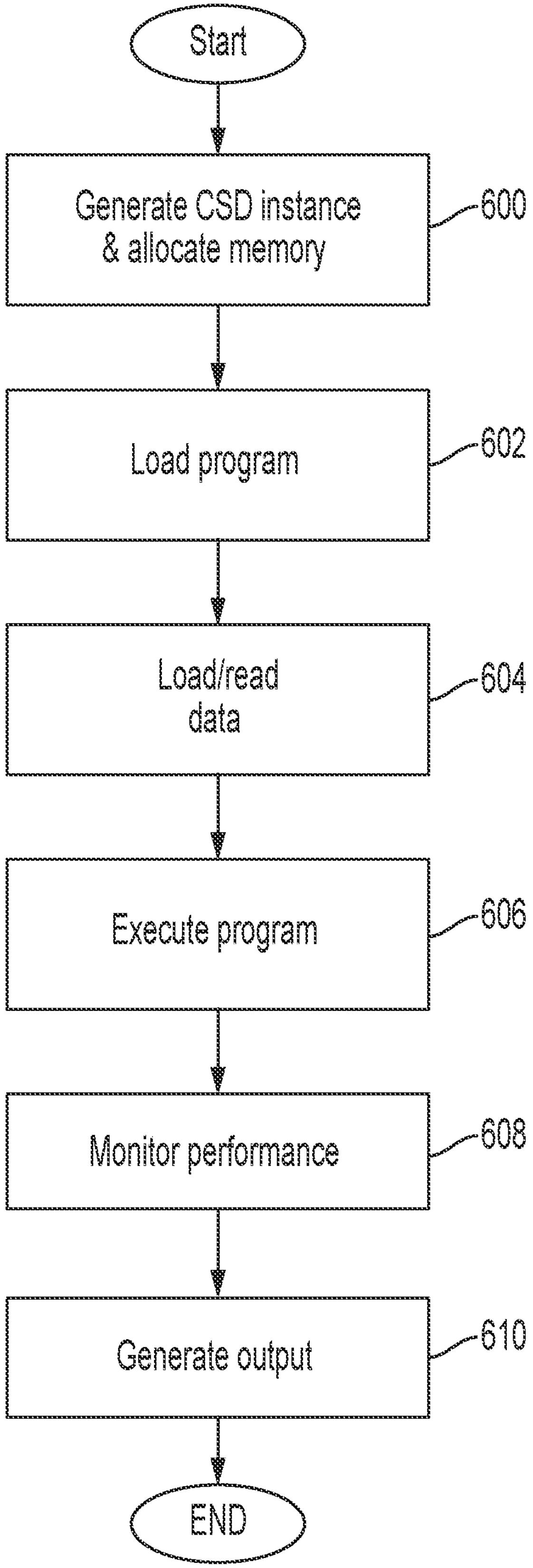
FIG. 6 depicts a flow diagram of a workflow for a computational storage device emulator according to one or more embodiments.

FIG. 6 depicts a flow diagram of a workflow for the CSD emulator 114 according to one or more embodiments. The process starts, and in act 600, the application 112 transmits a command (e.g., via the application interface 110) to generate one or more CSD instances 304. The application 112 may further identify one or more programs to be emulated by the one or more CSD instances 304. The generation of multiple CSD instances 304 may allow the emulation of multiple CSDs (e.g., concurrently) in executing the programs. In some embodiments, the one or more CSD instances 304 may be backed by one or more storage devices 102.

In some embodiments, the CSD instances 304 are generated by the CSD interface 300. The CSD interface 300 may maintain a list of the generated CSD instances 304. The CSD interface 300 may further allocate resources to the CSD instances 304. For example, the CSD interface 300 may allocate a CPM 302 range, a VM 404 (e.g., a uBPF VM), and/or the like.

In act 602, the application transmits a command to load the one or more programs. The one or more programs may be loaded into the CPM 302 allocated to the one or more CSD instances 304.

In act 604, the application transmits a command to load or read data from the storage device 102. The data to be loaded may be data needed for real data processing by the program. The CSD interface 300 may receive the load command, and translate the received command into an appropriate CSD command. The CSD command may be transmitted to the I/O engine 310 of the appropriate CSD instance 304 for retrieving the requested data from the storage device 102. The retrieved data may be stored in the CPM 302 allocated to the CSD instance 304.

In act 606, the application 112 transmits a command to execute the program. The CSD interface 300 may receive the command and translate the received command into an appropriate CSD command. The CSD command may be forwarded to the compute engine 308 of the appropriate CSD instance 304 for processing the command. In some embodiments, the compute engine 308 executes the program in response to the command. The executing of the program may include, for example, performing a computation based on the retrieved data.

In some embodiments, the compute engine 308 models the compute latency of the program without executing the program. In this regard, the compute engine 308 computes one or more types of latencies (e.g., interface command processing latency, internal message passing latency, hardware access latency, data processing latency, and/or the like), based on one or more parameters of the CSD 200 that is emulated.

In act 608, the performance monitor 306 collects one or more performance values based on the emulating. The performance values may include, for example, a data processing latency and a memory access latency. The performance monitor 306 may gather other types of performance data including, for example, a number of bytes read and/or written during execution of the program, a number of bytes processed, average compute latency, throughput of the CSD instance 304, CSD utilization, and/or the like.

In act 610, the CSD emulator 114 generates an output based on the performance data gathered by the performance monitor 306. In some embodiments, the output may include a signal indicating completion of the execution of the program. In some embodiments, the performance monitor 306 outputs the performance data for evaluation by the developer. One or more optimization actions may be performed based on the performance data. The one or more optimization actions may include, for example, whether to offload a program to the CSD, which program to offload and to which CSD, the number of programs to offload, and/or the like.

Figure 7:
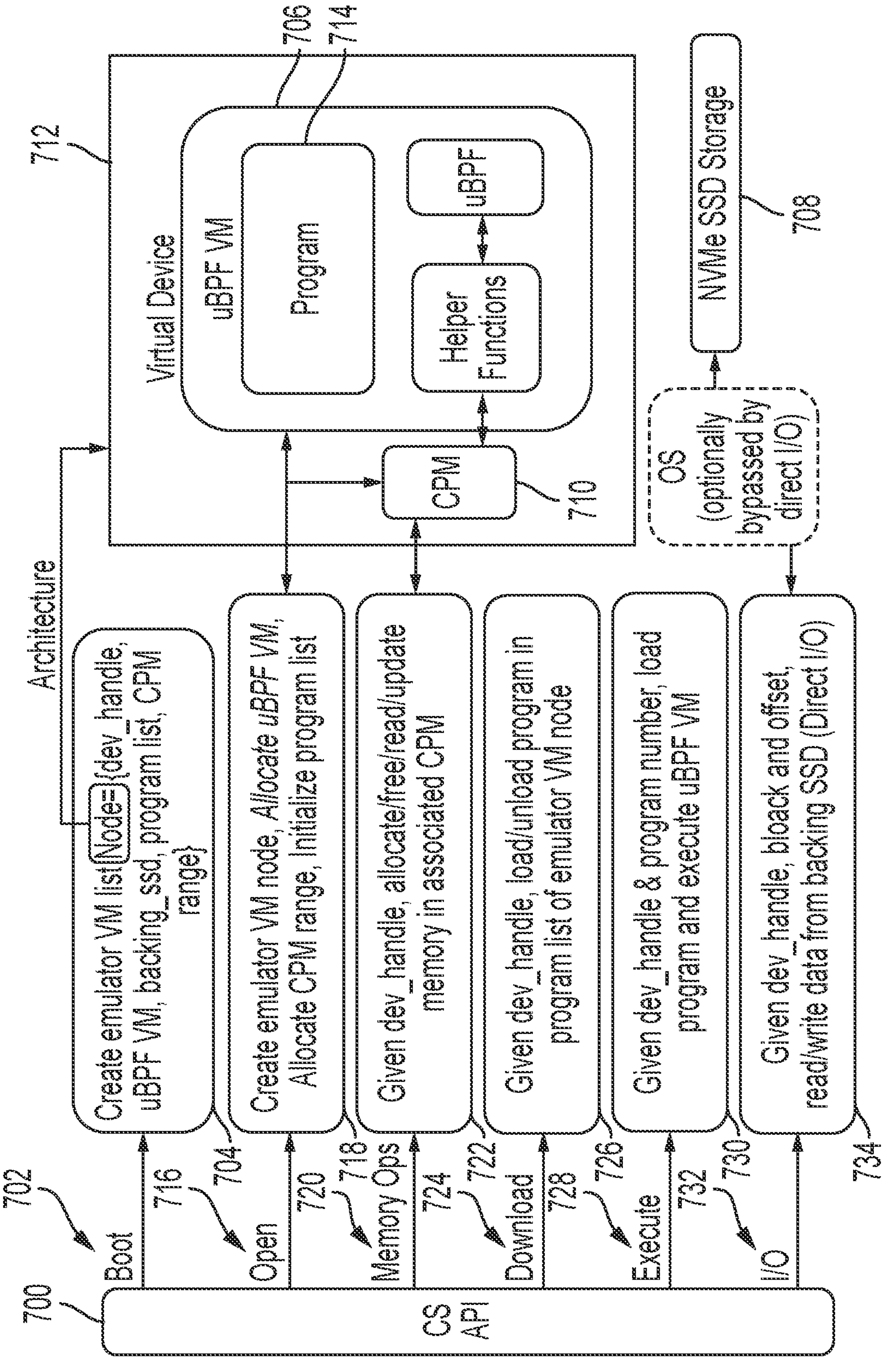
FIG. 7 depicts a block diagram of an interface configured to transmit commands for a computational storage device according one or more embodiments.

FIG. 7 depicts a block diagram of a CS API interface 700 configured to transmit commands for a CSD according one or more embodiments. The CS API interface 700 may be similar to the application interface 110 of FIG. 3. The CSD may be an eBPF-based CSD configured to execute an eBPF program.

The one or more commands generated by the CS API interface 700 may adhere to an interface protocol that may differ from the CSD interface protocol of the CSD. In some embodiments, the CSD interface may translate the API commands from the CS API interface 700 to a CSD command that adheres to the CSD interface protocol.

In some embodiments, the CS API interface 700 may issue a "boot" command 702. The CSD interface 300 may receive the "boot" command and generate one or more commands 704 for creating an emulator VM list. The emulator VM list may include a list of virtual devices 712 for emulating one or more CSDs 200. The virtual device 712 may be similar to the CSD instance 304 discussed above. The virtual device 712 may be associated with a uBPF VM 706 for executing an offloaded program 714, a list of programs to be executed, identification of a backend storage 708, and a range of a CPM 710. The uBPF VM 706, backend storage 708, and CPM 710 may be similar to respectively the uBPF VM 404, storage device 102, and CPM 302.

The CS API interface 700 may further issue an "open" command 716. The CSD interface 300 may receive the "open" command and issue one or more associated commands 718 for creating the virtual device 712, allocating the uBPF VM 706, allocating the CPM range, and initializing the program list.

The CS API interface 700 may also issue a memory operation command 720. The CSD interface 300 may receive the memory operation command and issue one or more associated commands 722 for allocating, freeing, reading, or updating memory in the CPM 710 allocated to the virtual device 712.

The CS API interface 700 may also issue a download command 724. The CSD interface 300 may receive the download command and issue one or more associated commands 726 for loading, unloading programs in the program list.

The CS API interface 700 may also issue an execute command 728. The CSD interface 300 may receive the execute command and issue one or more associated commands 730 for loading the identified program 714 and executing the program in the uBPF VM 706.

The CS API interface 700 may also issue an I/O command 732. The CSD interface 300 may receive the I/O command and issue one or more associated commands 734 for reading or writing data from the backend storage 708.

It should be appreciated that one or more embodiments of the present disclosure provide one or more advantages. One advantage may be that the CSD emulator 114 works like a real CS API-compatible device by downloading, storing, and running user-provided BPF code, and/or allocating and freeing memory. The CSD emulator 114 may allow a seamless transition for testing and deployment for clients, between emulator and computational storage devices. The CSD emulator 114 may also run in user space to prevent kernel crash on emulator crashes.

Another advantage may be that the CSD emulator 114 may allow for compute simulation. For example, throughput and latency may be calculated based on the user-provided processing latency information.

Another advantage may be that the CSD emulator 114 allows use of multiple virtual CSDs. The one or more CSDs may be backed by one or more NVMe SSDs for storage.

Another advantage may be that the CSD emulator 114 offloads benefit estimation. In this regard, the benefits of offloading a program to the CSD may be estimated by providing statistical information about the predicted performance of the CSD. For example, various statistics relating to data movement, memory usage, program storage use, and/or the like, may be aggregated for estimating the benefits.

One or more embodiments of the present disclosure may be implemented in one or more processors. The term processor may refer to one or more processors and/or one or more processing cores. The one or more processors may be hosted in a single device or distributed over multiple devices (e.g. over a cloud system). A processor may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processor, as used herein, each function is performed either by hardware configured, i.e., hard-wired, to perform that function, or by more general-purpose hardware, such as a CPU, configured to execute instructions stored in a non-transitory storage medium (e.g. memory). A processor may be fabricated on a single printed circuit board (PCB) or distributed over several interconnected PCBs. A processor may contain other processing circuits; for example, a processing circuit may include two processing circuits, an FPGA and a CPU, interconnected on a PCB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. Also, unless explicitly stated, the embodiments described herein are not mutually exclusive. Aspects of the embodiments described herein may be combined in some implementations.

As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

Although exemplary embodiments of systems and methods for emulating a CSD have been specifically described and illustrated herein, many modifications and variations will be apparent to those skilled in the art. Accordingly, it is to be understood that systems and methods for emulating a CSD constructed according to principles of this disclosure may be embodied other than as specifically described herein. The disclosure is also defined in the following claims, and equivalents thereof.

The systems and methods for processing storage transactions may contain one or more combination of features set forth in the below statements.

Statement 1. A system comprising: a non-volatile storage medium; and a processor coupled to the non-volatile storage medium, the processor being configured to: identify a program configured to be executed by a computational storage device; perform an action with respect to the program; compute a first performance value based on performing the action with respect to the program; retrieve data from the non-volatile storage medium; compute a second performance value based on retrieving the data from the non-volatile storage medium; and compute total performance of the computational storage device based on the first performance value and the second performance value.

Statement 2. The system of Statement 1, wherein the processor is further configured to: receive a first command and a second command from an application; and translate the first command to a translated first command, and the second command to a translated second command, wherein the processor is configured to perform the action with respect to the program based on the translated first command, and the processor is configured to retrieve the data from the non-volatile storage medium based on the translated second command.

Statement 3. The system of Statement 2, wherein the first command and the second command are based on a first interface for communicating with the computational storage device, and the translated first command and the translated second command are based on a second interface for communicating with the computational storage device.

Statement 4. The system of Statement 1, wherein the non-volatile storage medium includes a solid state drive.

Statement 5. The system of Statement 1, wherein the processor being configured to perform the action with respect to the program includes the processor being configured to: receive the program from an application; execute the program; and measure an execution time for the program, wherein the first performance value includes the execution time.

Statement 6. The system of Statement 1, wherein the processor being configured to perform the action with respect to the program includes the processor being configured to: receive the program from an application; identify latency information associated with the computational storage device; and determine an execution time of the program based on the latency information, wherein the first performance value includes the execution time.

Statement 7. The system of Statement 6, wherein the processor is further configured to: transmit a signal to the application based on detecting a criterion associated with the execution time.

Statement 8. The system of Statement 6, wherein the latency information includes data processing latency of at least one of an ARM processor, field-programmable gate array (FPGA), or graphics processing unit (GPU).

Statement 9. The system of Statement 1, wherein the first performance value includes at least one of command processing latency, message passing latency, hardware access latency, or memory access latency.

Statement 10. The system of Statement 1, wherein the processor being configured to compute the second performance value includes the processor being configured to: transmit a command to the non-volatile storage medium to retrieve the data; and measure a latency in retrieving the data based on the command.

Statement 11. A method comprising: identifying a program configured to be executed by a computational storage device; performing an action with respect to the program; computing a first performance value based on performing the action with respect to the program; retrieving data from a non-volatile storage medium; computing a second performance value based on retrieving the data from the non-volatile storage medium; and computing total performance of the computational storage device based on the first performance value and the second performance value.

Statement 12. The method of Statement 11 further comprising: receiving a first command and a second command from an application; and translating the first command to a translated first command, and the second command to a translated second command, wherein the performing the action is based on the translated first command, wherein the data is retrieved from the non-volatile storage medium based on the translated second command.

Statement 13. The method of Statement 12, wherein the first command and the second command are based on a first interface for communicating with the computational storage device, and the translated first command and the translated second command are based on a second interface for communicating with the computational storage device.

Statement 14. The method of Statement 11, wherein the non-volatile storage medium includes a solid state drive.

Statement 15. The method of Statement 11, wherein the performing the action includes: receiving the program from an application; executing the program; and measuring an execution time for the program, wherein the first performance value includes the execution time.

Statement 16. The method of Statement 11, wherein the performing the action includes: receiving the program from an application; identifying latency information associated with the computational storage device; and determining an execution time of the program based on the latency information, wherein the first performance value includes the execution time.

Statement 17. The method of Statement 16 further comprising: transmitting a signal to the application based on detecting a criterion associated with the execution time.

Statement 18. The method of Statement 16, wherein the latency information includes data processing latency of at least one of an ARM processor, field-programmable gate array (FPGA), or graphics processing unit (GPU).

Statement 19. The method of Statement 11, wherein the first performance value includes at least one of command processing latency, message passing latency, hardware access latency, or memory access latency.

Statement 20. The method of Statement 11, wherein the computing of the second performance value includes: transmitting a command to the non-volatile storage medium to retrieve the data; and measuring a latency in retrieving the data based on the command.

What is claimed is:

1. A system comprising:

a non-volatile storage medium; and a first processor of a host computing device coupled to the non-volatile storage medium, the first processor being configured to:

identify a program configured to be executed by a computational storage device;

identify a second processor of the computational storage device to execute the program;

perform an action with respect to the program based on identifying the second processor;

compute a first performance value based on performing the action with respect to the program, wherein the first performance value is indicative of expected performance by the second processor of the computational storage device in executing the program;

retrieve data from the non-volatile storage medium;

compute a second performance value based on retrieving the data from the non-volatile storage medium;

compute total performance of the computational storage device based on the first performance value and the second performance value;

based on the total performance of the computational storage device, select one of the host computing device or the computational storage device to execute the program.

2. The system of claim 1, wherein the first processor is further configured to:

receive a first command and a second command from an application; and translate the first command to a translated first command, and the second command to a translated second command, wherein the processor is configured to perform the action with respect to the program based on the translated first command, and the processor is configured to retrieve the data from the non-volatile storage medium based on the translated second command.

3. The system of claim 2, wherein the first command and the second command are based on a first interface for communicating with the computational storage device, and the translated first command and the translated second command are based on a second interface for communicating with the computational storage device.

4. The system of claim 1, wherein the non-volatile storage medium includes a solid state drive.

5. The system of claim 1, wherein the first processor being configured to perform the action with respect to the program includes the first processor being configured to:

receive the program from an application;

invoke an emulator for the second processor;

emulate, via the emulator, execution of the program on the second processor; and measure an execution time for the program, wherein the first performance value includes the execution time.

6. The system of claim 1, wherein the first processor being configured to perform the action with respect to the program includes the first processor being configured to:

receive the program from an application;

identify latency information associated with the computational storage device; and determine an execution time of the program based on the latency information, wherein the first performance value includes the execution time.

7. The system of claim 6, wherein the first processor is further configured to:

transmit a signal to the application based on detecting a criterion associated with the execution time.

8. The system of claim 6, wherein the latency information includes data processing latency of at least one of an ARM processor, field-programmable gate array (FPGA), or graphics processing unit (GPU).

9. The system of claim 1, wherein the first performance value includes at least one of command processing latency, message passing latency, hardware access latency, or memory access latency.

10. The system of claim 1, wherein the first processor being configured to compute the second performance value includes the first processor being configured to:

transmit a command to the non-volatile storage medium to retrieve the data; and measure a latency in retrieving the data based on the command.

11. A method comprising:

identifying, by a first processor of a host computing device, a program configured to be executed by a computational storage device;

identifying, by the first processor, a second processor of the computational storage device to execute the program;

performing, by the first processor, an action with respect to the program based on identifying the second processor;

computing, by the first processor, a first performance value based on performing the action with respect to the program, wherein the first performance value is indicative of expected performance by the second processor of the computational storage device in executing the program;

retrieving, by the first processor, data from a non-volatile storage medium;

computing, by the first processor, a second performance value based on retrieving the data from the non-volatile storage medium;

computing, by the first processor, total performance of the computational storage device based on the first performance value and the second performance value;

based on the total performance of the computational storage device, selecting, by the first processor, one of the host computing device or the computational storage device to execute the program.

12. The method of claim 11 further comprising:

receiving, by the first processor, a first command and a second command from an application; and translating, by the first processor, the first command to a translated first command, and the second command to a translated second command, wherein the performing the action is based on the translated first command, wherein the data is retrieved from the non-volatile storage medium based on the translated second command.

13. The method of claim 12, wherein the first command and the second command are based on a first interface for communicating with the computational storage device, and the translated first command and the translated second command are based on a second interface for communicating with the computational storage device.

14. The method of claim 11, wherein the non-volatile storage medium includes a solid state drive.

15. The method of claim 11, wherein the performing the action includes:

receiving, by the first processor, the program from an application;

invoking, by the first processor, an emulator for the second processor;

emulating, via the emulator, execution of the program on the second processor; and measuring, by the first processor, an execution time for the program, wherein the first performance value includes the execution time.

16. The method of claim 11, wherein the performing the action includes:

receiving, by the first processor, the program from an application;

identifying, by the first processor, latency information associated with the computational storage device; and determining, by the first processor, an execution time of the program based on the latency information, wherein the first performance value includes the execution time.

17. The method of claim 16 further comprising:

transmitting, by the first processor, a signal to the application based on detecting a criterion associated with the execution time.

18. The method of claim 16, wherein the latency information includes data processing latency of at least one of an ARM processor, field-programmable gate array (FPGA), or graphics processing unit (GPU).

19. The method of claim 11, wherein the first performance value includes at least one of command processing latency, message passing latency, hardware access latency, or memory access latency.

20. The method of claim 11, wherein the computing of the second performance value includes:

transmitting, by the first processor, a command to the non-volatile storage medium to retrieve the data; and measuring, by the first processor, a latency in retrieving the data based on the command.

* * * * *